Sept. 8, 1931.  R. MACHAT ET AL  1,821,980

TIGHTENING COLLAR WITH GRADUALLY BRAKED WINDER

Filed July 3, 1930

Inventors:
Machot Roland
Arthur Watkins

Patented Sept. 8, 1931

1,821,980

UNITED STATES PATENT OFFICE

ROLAND MACHAT AND ARTHUR MATHIEU, OF BRIVE, FRANCE

TIGHTENING COLLAR WITH GRADUALLY BRAKED WINDER

Application filed July 3, 1930, Serial No. 465,769, and in France July 5, 1929.

This invention relates to a hose clamp of the kind comprising a girdle which is tightened to the hose by means of a cotter pin adapted to turn in an eyelet at one end of the girdle and to wind upon it the other end portion of the girdle.

The object of the invention is to produce a clamp whereby a particularly tight and permanent grip is obtained on the hose, and the invention consists essentially in providing the girdle at one end with co-axial, resilient wire coils which serve as a bearing for the cotter pin and which are adapted to grip the latter with increasing force under the tension.

Figure 1:
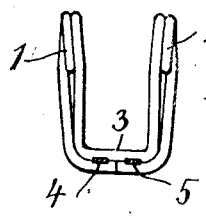
Figure 2:
Figure 3:
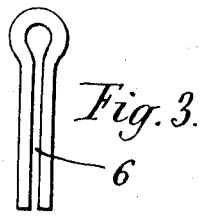
Figure 4:
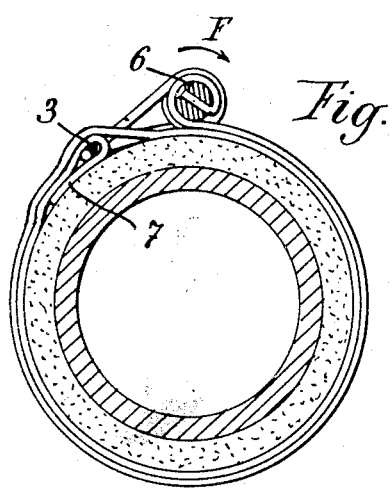
Figure 7:
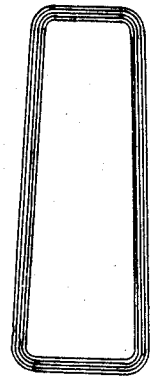
Figure 5:
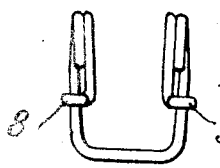
Figure 6:
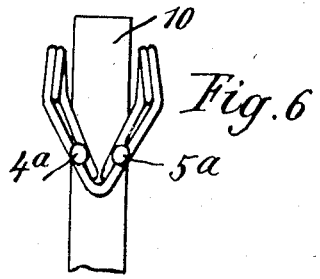
Figure 8:
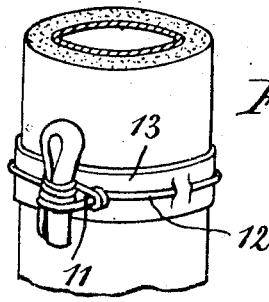

Fig. 1 of the accompanying drawings is a view of a wire loop for use with the girdle in the form of a metal strip, Fig. 2 is a view at right angles to Fig. 1, Fig. 3 is a view of the cotter pin, Fig. 4 is a view showing the clamp applied to a hose, Fig. 5 is a view of a modified wire loop, Fig. 6 is a view of another modification of the loop, Fig. 7 is a view of a still further modification, and Fig. 8 is a view of a further modification of the hose clamp, in operative position.

The hose clamp shown in Figs. 1 to 4 comprises a metal strip 7 one end of which is doubled back over a wire member formed with two sets of co-axial coils 1 and 2. The latter serve as a bearing for a cotter pin 6 upon which the opposite end portion of the metal strip is wound. Fig. 4 shows the clamp in operative position. The strip 7 is, after its connection to the wire loop, wound a couple of turns about the hose, whereupon the pin 6 is inserted in the wire coils 1 and 2 and the free end of the strip is inserted in the slit of the pin, between the coils. The cotter pin is now turned by means of a suitable tool in the direction of the arrow F so as to tighten the strip to the hose. The tension causes the wire coils to contract and to grip the pin which will therefore be retained together with the strip in tightened position. The greater the tension the greater the clamping effect, The wire structure may be subjected to modifications. It has preferably the form of a U-shaped member having the coils 1 and 2 situated at the free ends of the arms. The ends of the wire may, as shown in Fig. 1, be carried back from the coils and soldered at 4 and 5 to the wire portion 3 embraced by the metal strip.

Fig. 5 shows the ends of the wire looped at 8 and 9 about the arms under the coils. Fig. 6 shows a wire structure in the form of a V which is welded at 4a and 5a to the metal strip at a sufficient distance from the end 10 thereof to enable the latter to be clamped between the hose and the subsequent winding turns of the strip. The wire ends are secured by the welding to enable the coils to contract.

An endless loop may be formed from several turns of thin wire, the turns be either left parallel to each other or twisted together. The loop is subsequently given the rectangular shape shown in Fig. 7 and then bent to form the coils for the cotter pin.

Fig. 8 shows a metal strip 13 clamped to the hose by means of a wire 12. One end of the latter is looped as shown at 11 and coiled for engagement with the cotter pin. The opposite end of the wire is subsequently inserted in the slit of the pin and wound upon the latter for tightening the girdle to the hose.

We claim:

1. A hose clamp of the character described comprising a metal girdle, and a cotter pin adapted to receive and to wind upon it one end portion of said girdle, the opposite end of the girdle being fitted with co-axial, resilient wire coils adapted to serve as a bearing for said pin and to grip it with increasing force under the tension.

2. A hose clamp of the character described, comprising a girdle in the form of a metal strip, a cotter pin adapted to receive and to wind upon it one end portion of said strip, and a wire loop holding the opposite end of said strip and formed with co-axial, resilient coils adapted to serve as a bearing for said pin and to grip it with increasing force under the tension.

3. A hose clamp of the character described, comprising a metal girdle, a wire encircling said girdle, and a cotter pin adapted to receive and to wind upon it one end portion of said wire, the other end of the wire being looped and coiled to form a bearing for said pin, the wire coils being adapted to grip the pin with increasing force under the tension.

In testimony whereof we have signed our names to this specification.

ROLAND MACHAT.
ARTHUR MATHIEU.